United States Patent [19]

Golchert

[11] 4,024,287
[45] May 17, 1977

[54] FOOD DECORATING PROCESS

[76] Inventor: Robert L. Golchert, 915 Heritage Court Apts. S. No. 203, Crown Point, Ind. 46307

[22] Filed: Aug. 18, 1976

[21] Appl. No.: 715,576

Related U.S. Application Data

[63] Continuation of Ser. No. 599,991, July 29, 1975, abandoned.

[52] U.S. Cl. .................... 426/383; 35/26; 156/234; 156/277; 427/149; 426/104; 426/302; 428/914
[51] Int. Cl.² ............ A23G 3/28; B05C 1/00
[58] Field of Search ........... 426/87, 104, 383, 250, 426/302; 35/26; 156/230, 234, 277; 427/152, 149; 428/914; 206/1.7, 1.8

[56] References Cited

UNITED STATES PATENTS

| 683,765 | 6/1901 | Howard | 426/87 |
| 1,587,133 | 6/1926 | Anhof | 283/1 A |
| 1,887,161 | 11/1932 | Lorber | 35/26 |
| 2,353,594 | 7/1944 | Seagren | 426/87 |
| 2,578,150 | 12/1951 | Rathke | 426/383 X |
| 2,610,588 | 9/1952 | Seagren et al. | 426/104 |
| 3,852,494 | 12/1974 | Williamson | 426/383 |
| D227,642 | 7/1973 | Daenen | D7/43 |

Primary Examiner—Steven L. Weinstein
Attorney, Agent, or Firm—Harness, Dickey & Pierce

[57] ABSTRACT

A method of decorating various confectionary food items such as cakes, pies and the like which includes the steps of placing a transparent shield over a selected design to be transferred to the food item, placing a sheet of thin transfer medium over the shield and design to be traced, tracing said design on the transfer medium using edible ink, placing the transfer medium on the food item to be decorated with the colored side down, and placing a damp pad on the exposed back face of the transfer medium, thereby causing the traced design to be transferred to the food item.

4 Claims, 3 Drawing Figures

FOOD DECORATING PROCESS

This is a continuation of application Ser. No. 599,991, filed July 29, 1975, now abandoned.

BACKGROUND AND SUMMARY OF THE INVENTION

This invention relates to an improved method and kit for decorating various food items such as cakes, pies, cookies, and the like, and particularly for use by an inexperienced individual so as to allow such an individual to achieve a professional appearing result.

The majority of the prior art of which applicant is aware relating to cake decorating methods and kits therefor concern means for creating three-dimensional designs on a transfer paper by the user thereof, prepackaged transferable three-dimensional decoration, or require the use of multiple stencils.

The primary disadvantage of these prior devices and methods is that they limit the variety of designs available to the individual, particularly to the novice decorator, thus precluding such an individual lacking in artistic excellence from obtaining a distinctly unique decoration. Further, the apparatus required often is relatively expensive and requires considerable storage space when not is use. The prepackaged three-dimensional decorations often present a hard, less tasteful decoration, as well as limit the variety of designs available to the novice decorator.

The method of transferring a preprinted two-dimensional design using moisture to effect the transfer is known as having been employed in the decoration of Easter eggs. Also, a related transfer technique is disclosed in the patent to Howard, No. 683,765 relating to labels for meats wherein the moisture in the meat effects the transfer of a preprinted label; however, the label is designed to remain on the meat and the transfer serves only to insure a labeling remains in the event the paper label is dislodged. Also, the label is a preprinted type label.

The present invention overcomes the disadvantages of the prior art by providing an inexpensive compact kit requiring little storage space when not in use and by providing a method which eliminates the need for artistic ability in creating a unique or one-of-a-kind decoration.

In practicing the present invention, a design that is desired to be applied to a cake or other food product is selected. This design may be an original creation by the decorator or an existing picture which is desired to be copied. The design is then either drawn originally or traced onto a sheet of transfer medium, using various colors of a water soluble edible type ink material. This maybe accomplished by the use of pens, brushes, or other similar means. If the design is traced from an existing picture, a transparent impervious shield of a suitable material such as plastic is initially laid over the picture to protect it from bleeding of the colored ink.

The transfer medium is then placed over the food item to be decorated with the ink side down. A wet or damp sponge is then lightly applied to the back of the transfer medium so as to effect the transfer of the design. The design will thus be transferred to the food item. Thereafter the decorator may proceed to use colored frosting or gels to fill in the transferred design, or merely use the two-dimensional design as it is. In either case the novice or experienced decorator will have obtained a uniquely decorated food produce particularly suited to the occasion.

DETAILED DESCRIPTION OF THE INVENTION

Figure 1:
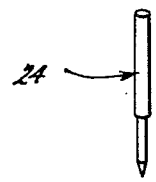
FIG. 1 is an exploded perspective view showing the various elements employed in practicing the present invention.
Figure 1:
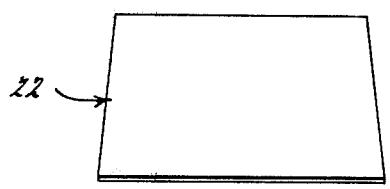
Figure 1:
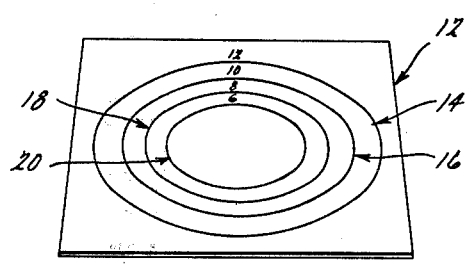
Figure 1:
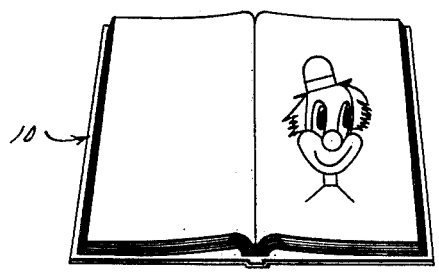

Because the invention is best suited for use by persons having minimal artistic ability, the first step in this novel method of decorating a cake or other food item is the selection of the design or picture to be transferred to the food item. This design or picture may be selected from any source such as book 10 in FIG. 1, and may be a favorite cartoon character from a comic book, a picture from a coloring book, or any like picture. Additionally, the design may be an original creation by the decorator.

If the picture is one to be traced or copied from a selected source, a transparent shield 12 is placed over the design to protect the original from the ink used in tracing or copying the picture. Transparent shield 12 may be fabricated from any suitable transparent nonpervious material, such as glass or plastic. The preferred structure is a plastic or a similar type of material due to its greater safety and resistance to breakage. Transparent shield 12 additionally may have a plurality of various size concentric circles 14, 16, 18 and 20, or rectangles (not shown), scribed or printed on its surface. The diameters of these concentric circles correspond to the conventional diameters of food articles to be decorated, such as cakes, thereby providing a guide for sizing the decoration to the item to be decorated.

A transfer medium 22 is then placed over the transparent shield and the design to be transferred. Tracing medium 22 may be any standard, moderately porous and absorbant, semitransparent paper substance, such as conventional tissue or copy paper, preferably not of the erasible type. Although some toweling may work, it is generally too porous as a result of which the ink spreads badly.

The design to be transferred is then traced on the transfer medium using any suitable drawing instrument 24. In the preferred embodiment, a felt or fiber tipped felt marking pen filled with a water soluble edible coloring ink, preferably liquid in form, such as standard food coloring, is used. It will be noted, however, that other types of drawing instruments may be utilized in connection with a water soluble and edible coloring agent, such as brushes or conventional fountain pens. If the design is an original work of art by the decorator it may be drawn directly on the transfer medium, rather than traced, in which case the shield would not be used.

Figure 2:
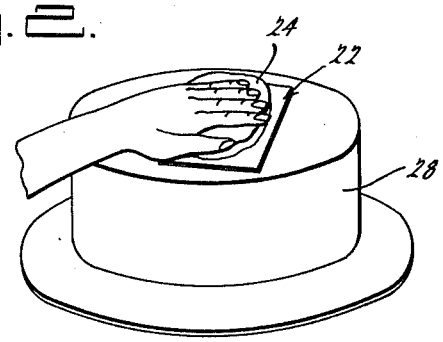
FIGS. 2 and 3 are perspective views of several steps of the method of the present invention.
Figure 3:
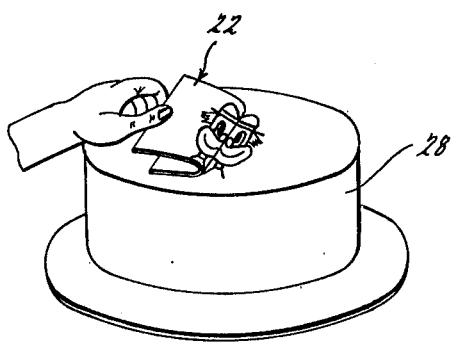

Once the desired design has been completely drawn on transfer medium 22, the latter is placed over the food item to be decorated with the side containing the design facing the item to be decorated. A moistened pad or sponge 26 is then placed over transfer medium 22 and design, as shown in FIG. 2, thereby causing the design to become partially dissolved and thereby be transferred to the item to be decorated, indicated at 28. Moistened pad 26 and transfer medium 22 are then carefully removed from decorated item 26, as shown in FIG. 3, leaving the transferred design on the food item.

The decorator may, if desired, proceed to add a three-dimensional effect and/or additional coloring to the transferred design using conventional decorating mediums, such as gels, icings, or other decorative objects. The transferred design, however, may be left in its two-dimensional state as transferred if so desired.

The present invention also resides in the provision of a kit including an impervious transparent shield 12 with a plurality of concentric circles or other shapes of varying size on its surface, multiple sheets of transfer medium 22 and a plurality of tracing or marking instruments 24 (such as felt tip pens) in assorted colors of water soluble edible ink or brushes and a supply of coloring agents. Also, one or more sheets of printed designs may be included in the kit for tracing by the decorator onto transfer medium.

To those skilled in the art to which this invention relates, changes in the method, apparatus and application of this invention will suggest themselves without departing from the spirit and scope of this invention, and the disclosures contained herein are not intended to be limiting in any sense.

I claim:

1. The process of decorating a food item comprising the following steps:
   a. selecting a two-dimensional design to be transferred to the food item;
   b. placing over said design a transparent and impervious shield having indicia thereon representing the general configuration of the food item to be decorated;
   c. positioning said shield with respect to said design using said indicia to thereby facilitate the proper positioning of the design on said food item;
   d. placing a sheet of moderately porous semi-transparent transfer medium over said shield and design;
   e. tracing said design onto said transfer medium using one or more felt or fiber tipped pens filled with water soluble, edible colored ink or food coloring said shield protecting the original design from said ink or food coloring used in tracing said design;
   f. placing said transfer medium containing said traced design on said food item to be decorated with said design side facing and contacting said food item;
   g. placing a moistened element on the exposed back surface of said transfer medium and said design to cause said design to be transferred to said food item; and
   h. removing said moistened element and said transfer medium from the decorated food item.

2. The process of claim 1 wherein said transfer medium is tissue paper.

3. The process of claim 1 wherein said shield is formed of clear plastic.

4. The process of claim 1 wherein said shield indicia are arranged concentrically thereon.

* * * * *